US012280344B2

(12) United States Patent
Merick et al.

(10) Patent No.: US 12,280,344 B2
(45) Date of Patent: Apr. 22, 2025

(54) WEAR-INDICATING MIXING AND DISPERSION BLADE

(71) Applicant: SWIMC LLC, Cleveland, OH (US)

(72) Inventors: Rudolph S. Merick, Broadview Heights, OH (US); Christopher Wihlon, Louisville, KY (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/738,406

(22) Filed: Jun. 10, 2024

(65) Prior Publication Data

US 2024/0416301 A1 Dec. 19, 2024

Related U.S. Application Data

(60) Provisional application No. 63/472,965, filed on Jun. 14, 2023.

(51) Int. Cl.

*B01F 27/00* (2022.01)
*B01F 27/053* (2022.01)
*B01F 27/1152* (2022.01)
*B01F 101/30* (2022.01)

(52) U.S. Cl.

CPC ........ *B01F 27/1152* (2022.01); *B01F 27/053* (2022.01); *B01F 2101/30* (2022.01); *B01F 2215/0422* (2013.01); *B01F 2215/0431* (2013.01)

(58) Field of Classification Search

CPC ............... B01F 27/1152; B01F 27/053; B01F 2101/30; B01F 2215/0422; B01F 2215/0431; B01F 27/052

See application file for complete search history.

(56) References Cited

U.S. PATENT DOCUMENTS 3,376,024 A * 4/1968 Beechler ............. B01F 27/1152 416/237
5,409,313 A * 4/1995 Funk ..................... B01F 27/053 241/162

FOREIGN PATENT DOCUMENTS

JP 2006043668 A 2/2006
JP 2013094689 A 5/2013
JP 2018149478 A 9/2018
JP 2022133244 A 9/2022
WO 2020234425 A1 11/2020

OTHER PUBLICATIONS

International Search Report and Written Opinion from corresponding International Application No. PCT/US2024/033210 mailed on Sep. 17, 2024, 12 pages.

* cited by examiner

*Primary Examiner* — Anshu Bhatia
(74) *Attorney, Agent, or Firm* — Tucker Ellis LLP

(57) ABSTRACT

A mixing system for pigment dispersions, colorants, paints, and coatings, including a mixing or dispersion blade having a disc having top and bottom surfaces and an outboard edge, vanes circumferentially spaced around and extending from the outboard edge of the disc, each vane oriented non-horizontal to the top surface of the disc, and a wear-indicating notch in at least one of the vanes; and a tank, the tank including a paint, pigment dispersion, colorant, or coating.

28 Claims, 9 Drawing Sheets

WEAR-INDICATING MIXING AND DISPERSION BLADE

REFERENCE TO RELATED APPLICATIONS

This application claims priority to U.S. Provisional Patent Application No. 63/472,965, filed on Jun. 14, 2023, the entirety of which is incorporated by reference.

TECHNICAL FIELD

In general, the present invention relates to a blade, and in particular to a high speed dispersion (HSD) blade for mixing material.

BACKGROUND OF THE INVENTION

Mixing and dispersing blades, also known as high speed dispersion blades, may be attached to a shaft and inserted into a vessel to mix and disperse materials for a variety of applications, including pigment dispersions, colorants, paints, coatings, etc. Usually used to disperse powder material in a liquid, these blades can be particularly effective at dispersing agglomerated particulate solids in a viscous liquid, or mixing multiple viscous liquids together. High speed dispersion blades work by transferring energy to the mixed material. More specifically, solids and liquids may be placed in a vessel and are drawn into the blade by suction created by the rotating blade. The suction creates a whirlpool in the liquid, drawing material into the blade and out from the side of the blade into the sides of the mixing vessel. The rapid acceleration of the material and projection into the vessel walls shears the solid and liquid, effecting mixing and dispersion of the material.

High speed dispersion is commonly used in the paints, colorants, and coatings industry to disperse inorganic pigments or extenders, which often are mined from natural sources, in a viscous liquid, as part of the manufacturing process for dispersed pigments, colorants, paints, or other coatings. The medium in which the pigment or extender may be dispersed varies and may include water, in a grind stage, or water with a polymeric binder in other manufacturing stages. Over time, however, the pigments or extenders wear down blade edges, requiring overall more work to effect mixing or dispersion and/or requiring additional time. The degree of wear on a dispersion blade conventionally is assessed by capturing the power and time required for dispersion between multiple manufacturing runs and evaluating decreases in dispersion efficiency. This evaluation requires tracking over long periods of time, additional equipment, and employee training and time. Thus, what is needed is an improved way to evaluate blade wear.

SUMMARY OF THE INVENTION

Disclosed is a mixing blade that allows for assessment of blade wear by visual examination. Mixing blades of the present disclosure include a disc having top and bottom surfaces and an outboard edge, vanes circumferentially spaced around and extending from the outboard edge of the disc, each vane oriented non-horizontal to the top surface of the disc, and a wear-indicating notch in at least one of the vanes.

These aspects may be combined with one or more additional, optional aspects as disclosed herein. In some approaches, the wear-indicating notch may extend partially toward a top edge of the vane from a bottom edge of the vane.

In some approaches, the bottom edge of the vane with the wear-indicating notch may be coplanar with the top or bottom surface.

In some approaches, a first plurality of the vanes may be oriented upward away from the top surface and a second plurality of the vanes may be oriented downward away from the bottom surface, wherein the wear-indicating notch is on at least one of the vanes oriented upward and extends partially toward the top edge of the vane from the bottom edge of the vane coplanar with the bottom surface.

In some approaches, the wear-indicating notch may extend about ten percent to about seventy-five percent of a height of the vane from the bottom edge to the top edge, about sixty-percent, and/or about fifty percent.

In some approaches, the at least one vane with the wear-indicating notch may have a non-vertical leading edge.

In some approaches, the vanes may have a non-vertical leading edge.

In some approaches, the wear-indicating notch may extend from a bottom edge of the vane partially toward the leading edge of the vane.

In some approaches, the at least one vane with the wear-indicating notch may have a trailing edge less than 60° of vertical compared to the top surface or bottom surface of the disc, preferably less than 45°, preferably less than 30°, preferably less than 10°.

In some approaches, a plurality of vanes may have a trailing edge vertical to the top surface or bottom surface of the disc.

In some approaches, the at least one vane with the wear-indicating notch may have a non-vertical trailing edge.

In some approaches, at least a portion of the vanes may have a non-vertical trailing edge.

In some approaches, the at least one vane having a wear-indicating notch may have a leading edge and a trailing edge, and wherein a leading edge of the wear-indicating notch is spaced a distance from an end of the leading edge of the vane that is less than fifty percent of a length of the at least one vane in a circumferential direction.

In some approaches, the notch may have a leading edge and a trailing edge, and wherein a length of the notch in a circumferential direction is less than fifty percent of a length of the vane in the circumferential direction.

In some approaches, the disc may have a diameter of at least about one inch, preferably at least about two inches, or at least about six inches, or at least about eighteen inches, or at least twenty-four inches.

In some approaches, the disc may have a diameter of at most about forty inches, preferably at most about thirty inches, preferably at most about twenty-four inches, preferably at most about twelve inches, preferably at most about six inches, preferably at most about three inches.

In some approaches, a plurality of the vanes may be oriented upward away from the top surface, and a plurality of the vanes are oriented downward away from the bottom surface.

In some approaches, each vane may be oriented upward or downward opposite an adjacent vane.

In some approaches, at least one vane may be oriented at least thirty degrees from the top or bottom surface, at least forty-five degrees, and/or at least seventy-five degrees.

In some approaches, each vane may be oriented at least thirty degrees from the top or bottom surface, at least forty-five degrees, and/or at least seventy-five degrees.

In some approaches, the mixing blade may be formed of metal, optionally steel, stainless steel, aluminum, or an alloy thereof.

In some approaches, the blade may be coated, optionally with a carbide coating, optionally a tungsten carbide coating, optionally a polymeric coating, optionally a polytetrafluoroethylene coating.

In some approaches, the mixing blade may be formed of polymer, optionally nylon.

In some approaches, the disc may include a central opening for receiving a shaft.

In some approaches, the disc may include one or more baffles.

In some approaches, the top edge of at least one of the vanes may be serrated.

In some approaches, the mixing blade is a high speed dispersion blade.

Also disclosed is a mixing blade assembly that may include the mixing blade as disclosed herein and a shaft configured to attach to the central opening of the disc. Aspects of the mixing blade assembly may be combined with one or more optional aspects as further disclosed herein.

In some approaches, the mixing blade may include a reverse thread and the shaft includes a reverse thread for receiving the mixing blade.

In some approaches, the disc may include a keyhole for receiving the shaft.

Also disclosed is a mixing system that may include the mixing blade assembly as disclosed herein and a tank having a tank diameter. Aspects of the mixing blade assembly may be combined with one or more optional aspects as further disclosed herein.

In some approaches, the tank diameter may be no less than two times a diameter of the mixing blade, optionally no less than two and a half times, optionally no less than two and seven tenths times, optionally no less than two and nine tenths times.

In some approaches, the tank diameter may be no more than four times the mixing blade diameter, optionally no more than three and a half times, optionally no more than three and three tenths times, optionally no more than three and one tenth times.

In some approaches, also disclosed is a mixing blade including a disc having a top surface and a bottom surface and an outboard edge, a first plurality of vanes circumferentially spaced around and extending from the outboard edge of the disc, each vane oriented upward away from the top surface of the vane and having a bottom edge coplanar with the bottom surface, and a top edge, a second plurality of vanes circumferentially spaced around and extending from the outboard edge of the disc, each vane oriented downward away from the bottom surface of the vane and having a bottom edge coplanar with the top surface, and a top edge, and a wear-indicating notch in at least one of the first or second plurality of vanes, the wear-indicating notch extending partially toward the top edge of the vane from the bottom edge of the vane.

In some approaches, the wear-indicating notch may extend about ten percent to about seventy-five percent of a height of the vane from the bottom edge to the top edge, optionally about sixty-percent, optionally about fifty percent.

Also disclosed is a method of assessing the mixing blade as disclosed herein for wear using the mixing blade, the method including visually inspecting at least one vane of the mixing blade to evaluate whether a wear-indicating notch on the vane is visible following mixing a viscous liquid or dispersion using the blade.

In some approaches, the mixing may be high speed dispersion.

These and other aspects of this invention will be evident when viewed in light of the drawings, detailed description and appended claims.

The summary of the present disclosure is not intended to describe each disclosed embodiment or every implementation of the present disclosure. The description that follows more particularly exemplifies illustrative embodiments. In several places throughout the disclosure, guidance is provided through lists of examples, which examples may be used in various combinations. In each instance, any recited lists serve only as a representative group and should not be interpreted as an exclusive or exhaustive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
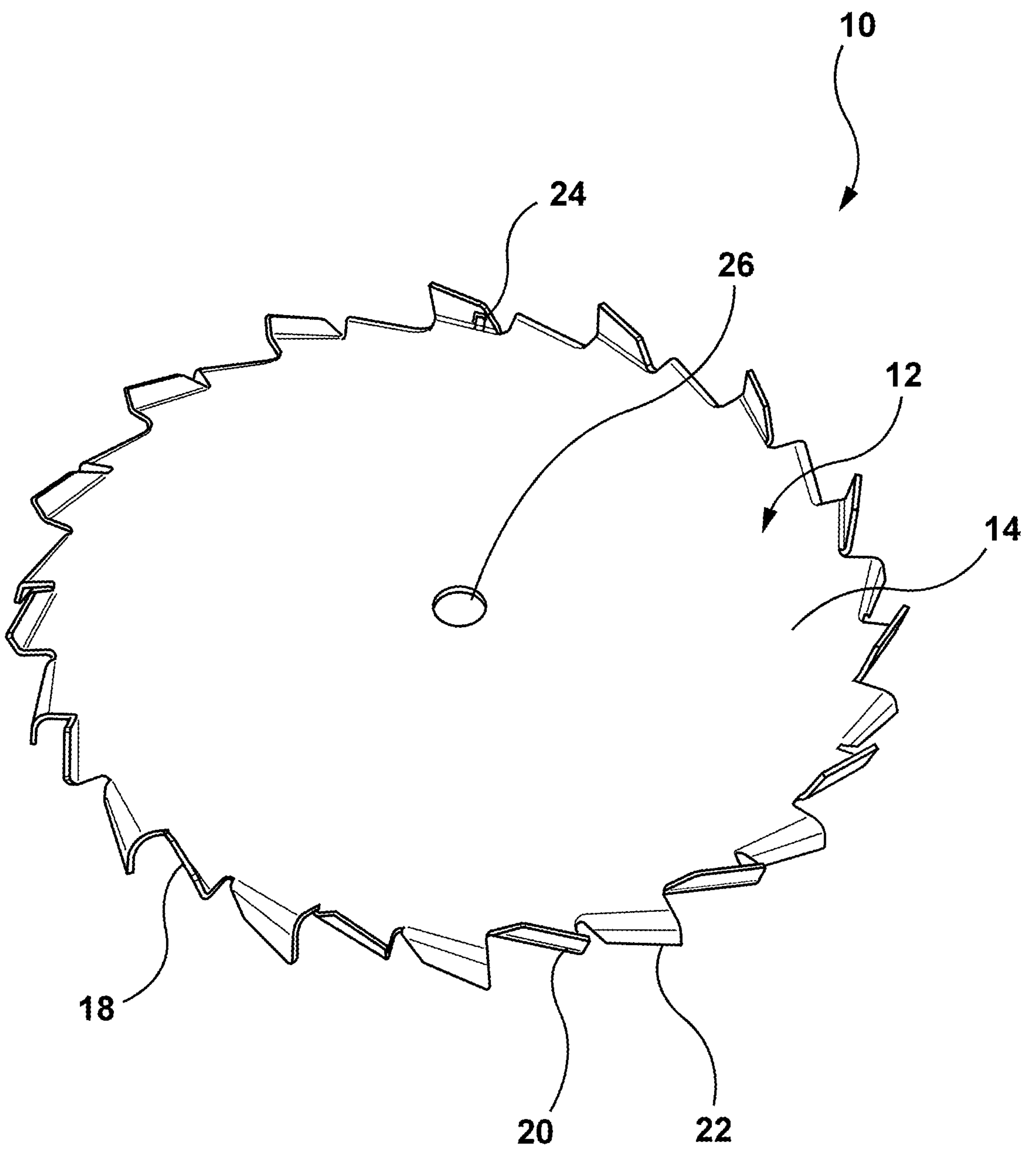
FIG. 1 is a perspective view of an exemplary mixing blade.

Disclosed is a mixing blade comprising a disc having top and bottom surfaces and an outboard edge, vanes circumferentially spaced around and extending from the outboard edge of the disc, each vane oriented non-horizontal to the top surface of the disc, and a wear-indicating notch in at least one of the vanes.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Figure 2:
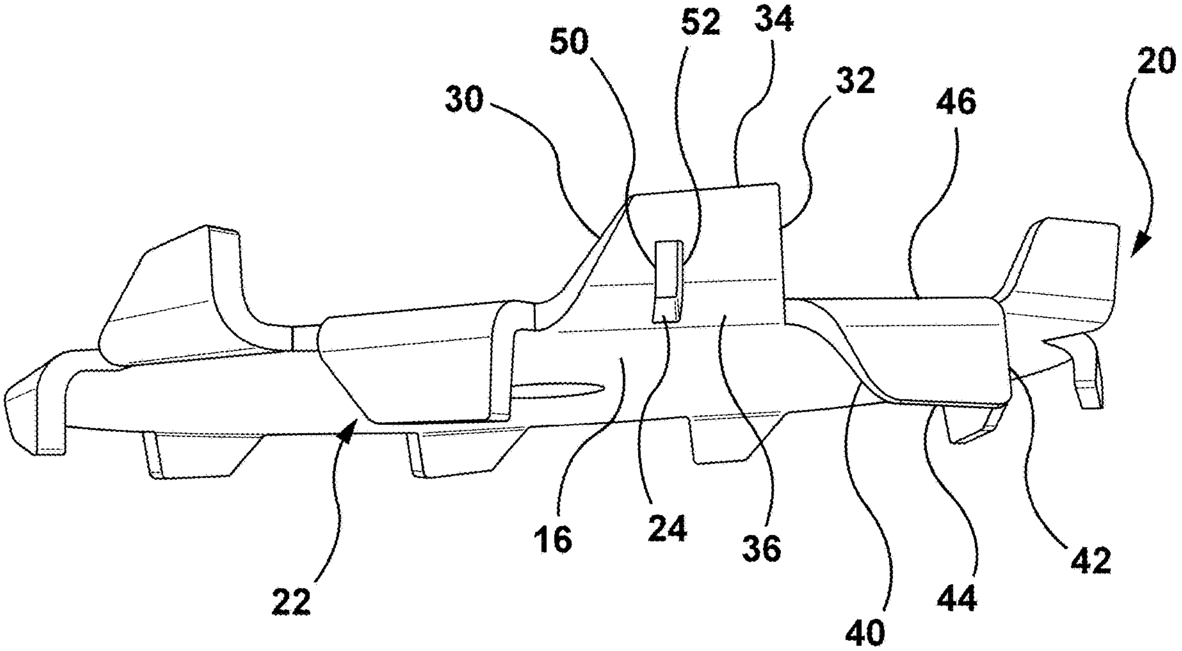
FIG. 2 is a side view of the mixing blade.
Figure 3:
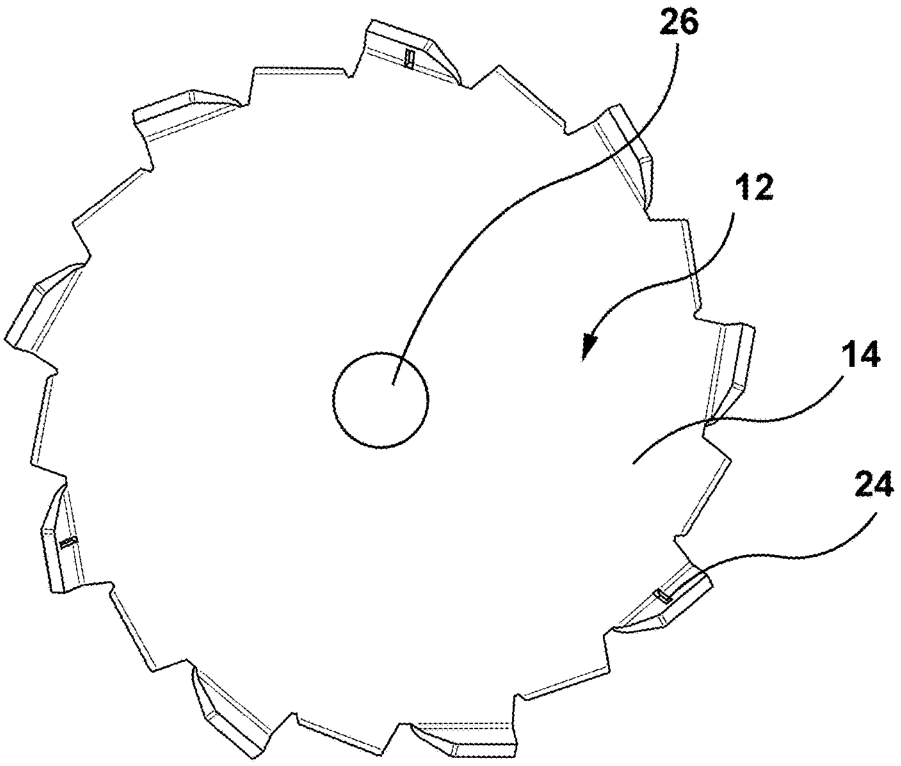
FIG. 3 is a top view of the mixing blade.

Turning initially to FIGS. 1-3, an exemplary blade is shown at reference numeral 10. The blade 10 may be used for mixing and dispersing materials, and will hereinafter be referred to as a high speed dispersion blade. The high speed dispersion blade 10 may be used to evenly disperse and distribute pigment or extender particles in a carrier within a vessel such as a tank, for example, for the manufacture of pigments, pigment concentrates, colorant compositions, and coating compositions, such as paints, stains, etc. The high speed dispersion blade 10 may be made of a suitable material, such as metal, such as steel, stainless steel, aluminum, or an alloy thereof. In some implementations, the high speed dispersion blade may be coated, for example by a carbide coating, tungsten carbide coating, polymeric coating, polytetrafluoroethylene coating, etc. Alternatively, in some implementations, the high speed dispersion blade may be formed of a suitable material such as a polymer, such as a nylon.

The high speed dispersion blade 10 includes a disc 12 having a top surface 14, a bottom surface 16, and an outboard edge 18, vanes 20, 22 circumferentially spaced around and extending from the outboard edge 18 of the disc 12, and a wear-indicating notch 24 in at least one of the vanes 20, 22. In some implementations, the disc 12 may have a diameter of at least about one inch. In an implementation, the disc 12 may have a diameter of at least about two inches. In an implementation, the disc 12 may have a diameter of at least about six inches. In some implementations, the disc 12 may have a diameter of at least about eighteen inches. In some implementations, the disc 12 may have a diameter of at least about twenty-four inches. In some implementations, the disc 12 may have a diameter of at most about forty inches. In some implementations, the disc 12 may have a diameter of at most about thirty inches. In some implementations, the disc 12 may have a diameter of at most about twenty-four inches. In some implementations, the disc 12 may have a diameter of at most about twelve inches. In some implementations, the disc 12 may have a diameter of at most about six inches. In some implementations, the disc 12 may have a diameter of at most about three inches.

Figure 4:
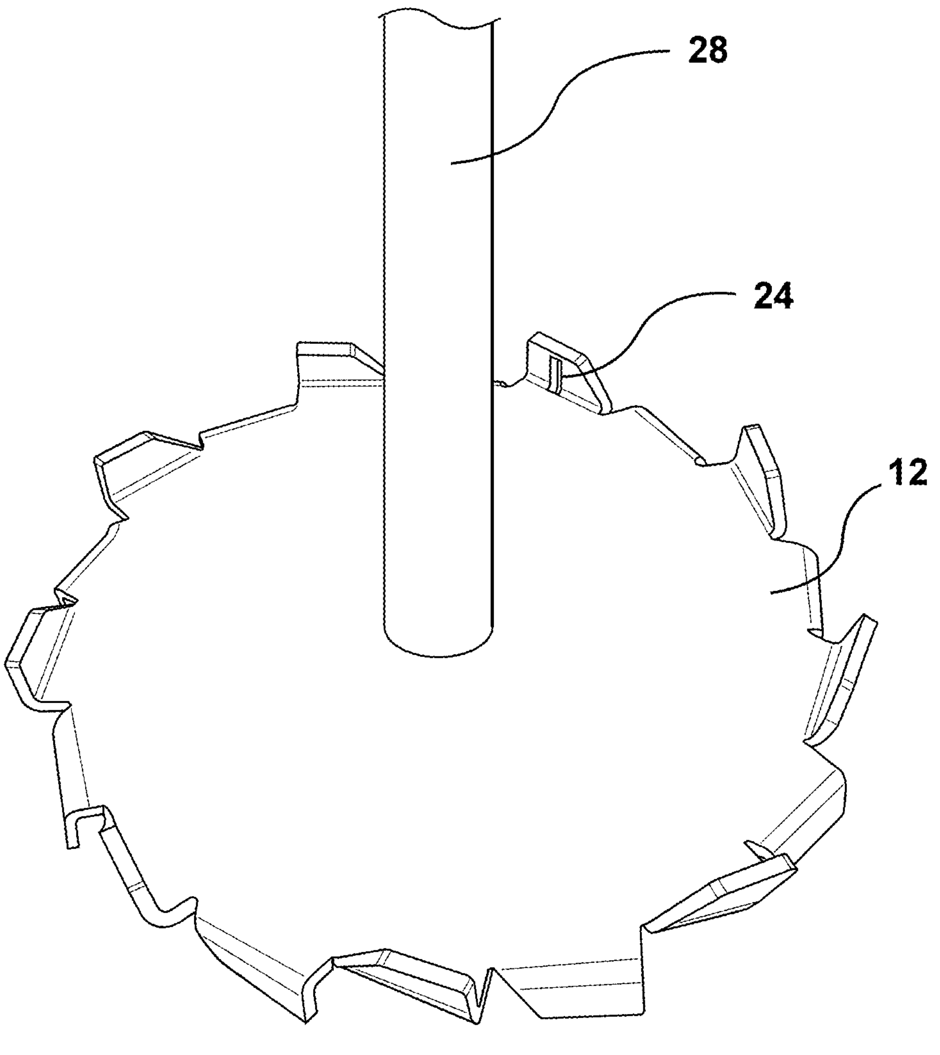
FIG. 4 is a perspective view of a mixing blade assembly.
Figure 5:
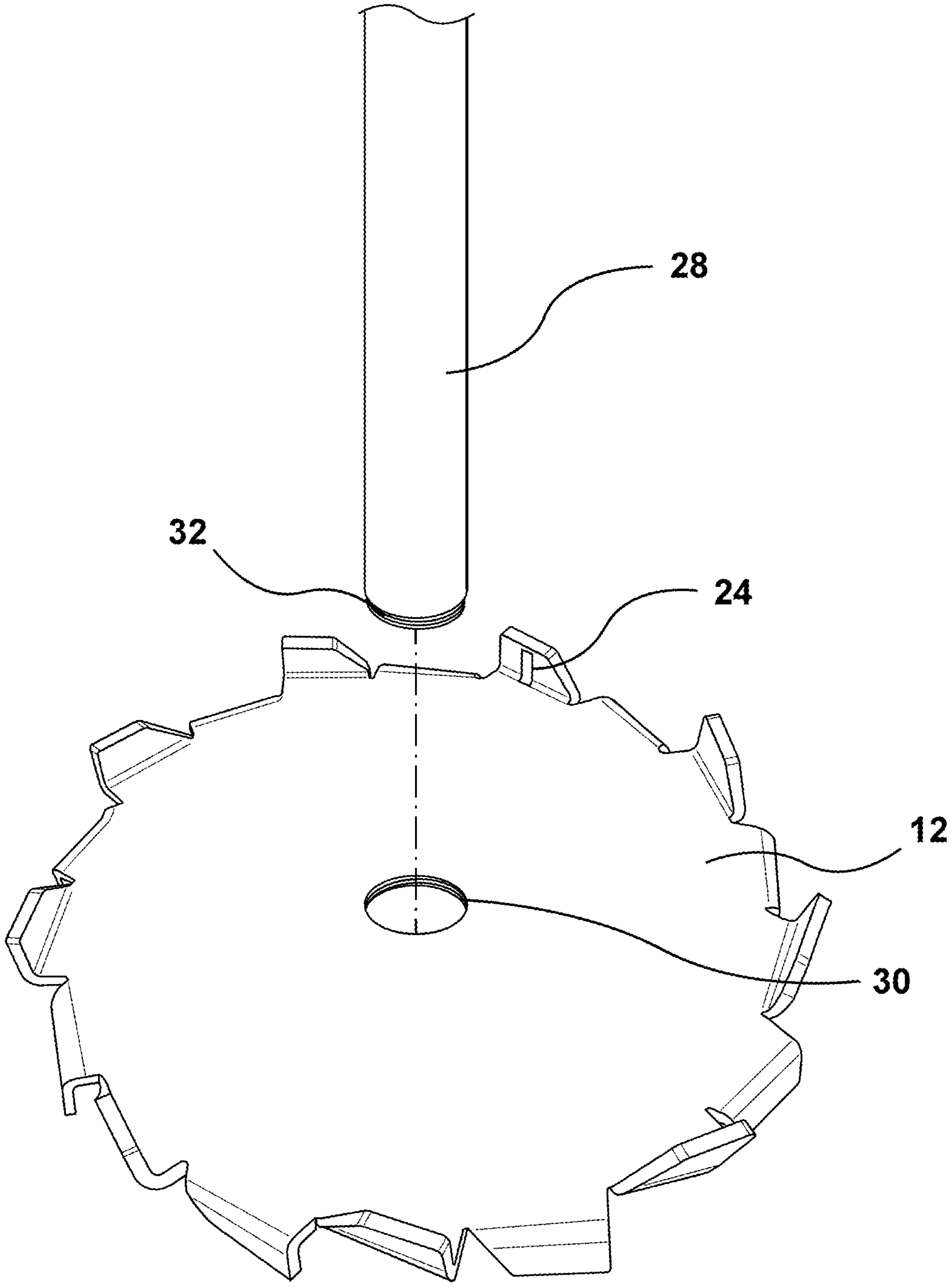
FIG. 5 is a cross-sectional view of the mixing blade assembly.

Turning additionally to FIGS. 4 and 5, the disc may also include a central opening 26 for receiving a shaft 28 to drive rotation of the high speed dispersion blade 10. In an implementation, the central opening 26 is a threaded opening including reverse threads 30 for mating with corresponding reverse threads 32 on the shaft 28. It will be appreciated that other suitable attachment methods may be used to attach the shaft to the high speed dispersion blade. For example, the disc may additionally include one or more pin holes or the like around the opening 26. Additionally, the shaft and central opening may include a keyhole for mating the central opening and the disc.

Referring now to the vanes 20, 22 in detail, each vane 20, 22 may be oriented non-horizontal to the top surface 14 of the disc 12. The vanes 20 may be oriented upward away from the top surface 14 of the disc 12 and the vanes 22 may be oriented downward away from the bottom surface 16 of the disc 12. In some implementations, each vane 20, 22 is oriented upward or downward opposite an adjacent vane 20, 22 such that the vanes 20, 22 alternate around the outboard edge 18 of the disc 12. In some implementations, at least one vane 20, 22 is oriented at least thirty degrees from the top or bottom surface 14, 16. In some implementations, at least one vane 20, 22 is oriented at least forty-five degrees from the top or bottom surface 14, 16. In some implementations, at least one vane 20, 22 is oriented at least seventy-five degrees from the top or bottom surface 14, 16. In some implementations, each vane 20, 22 is oriented at least thirty degrees from the top or bottom surface 14, 16. In some implementations, each vane 20, 22 is oriented at least forty-five degrees from the top or bottom surface 14, 16. In some implementations, each vane 20, 22 is oriented at least seventy-five degrees from the top or bottom surface 14, 16.

The vanes 20 each include a leading edge 30, a trailing edge 32, a top edge 34, and a bottom edge 36, and the vanes 22 each include a leading edge 40, a trailing edge 42, a top edge 44, and a bottom edge 46. The leading edges 30 and 40 of the vanes 20 and 22 may be non-vertical such that they are not perpendicular to a plane of the disc 12, and the trailing edges 32 and 42 of the vanes 20 and 22 may be vertical to the top surface 14 and bottom surface 16 of the disc 12 respectively. The bottom edge 36 of each vane 20 may be coplanar with the bottom surface 16, and the bottom edge 46 of each vane 22 may be coplanar with the top surface 14. It will be appreciated, however, that the leading edges 30 and 40 and the trailing edges 32 and 42 of the vanes 20 and 22 may be vertical or non-vertical or a combination thereof, and the bottom edges 36 and 46 of the vanes 20 and 22 may be offset from a plane of the top or bottom surface 14, 16.

Turning now to the wear-indicating notch 24 in detail, the wear-indicating notch 24 allows for blade wear inspection while the high speed dispersion blade 10 in in the tank, thus allowing an operator to view the high speed dispersion blade 10 from a distance and from various angles without having to remove the high speed dispersion blade 10 from the tank. In some instances, an operator of a high speed dispersion mixer will view the mixing blade from above and from multiple feet away. The wear-indicating notice of the present invention allows for inspection of blade wear from such distances and perspectives.

Blades of the present disclosure having one or more wear-indicating notches are particularly designed for use with dispersion of pigments and extenders in pigment concentrates, colorant compositions, paints, and coatings. These end-use applications commonly incorporate significant amounts of mineral-based pigments and extenders, which wear dispersion blades. Paints and coatings typically include mineral-based pigments and extenders such as anatase or rutile titanium dioxide, calcium carbonate, talc, clay minerals, aluminum oxide, silicon dioxide, magnesium oxide, zinc sulfate. Furthermore, at manufacturing scale, mixing tanks can range in sizes up to approximately 12 or more feet across, making detailed, microscopic examination of blade wear impractical. Instead, a blade-wear indicator for such end-uses must allow for in-line examination during the manufacturing process, or between manufacturing batches.

The wear-indicating notch 24 may be provided in one or more of the vanes 20 oriented upward and extending partially toward the top edge 34 of the vane 20 from the bottom edge 36 of the vane 20. In some implementations, the wear-indicating notch 24 extends about ten percent to about seventy-five percent of a height of the vane 20 from the bottom edge 36 to the top edge 34 of the vane. In some implementations, the wear-indicating notch 24 extends about sixty percent of the height of the vane 20 from the bottom edge 36 to the top edge 34 of the vane. In some implementations, the wear-indicating notch 24 extends about fifty percent of the height of the vane 20 from the bottom edge 36 to the top edge 34 of the vane. In some implementations, the wear-indicating notch 24 also extends from the bottom edge 36 of the vane 20 partially toward the leading edge 30 of the vane 20.

Additionally or alternatively, the wear-indicating notch 24 may be provided in one or more of the vanes 22 oriented downward and extending partially toward the top edge 44 of the vane 22 from the bottom edge 46 of the vane 22. In some implementations, the wear-indicating notch 24 extends about ten percent to about seventy-five percent of a height of the vane 22 from the bottom edge 46 to the top edge 44 of the vane. In some implementations, the wear-indicating notch 24 extends about sixty percent of the height of the vane 22 from the bottom edge 46 to the top edge 44 of the vane. In some implementations, the wear-indicating notch 24 extends about fifty percent of the height of the vane 22 from the bottom edge 46 to the top edge 44 of the vane. In some implementations, the wear-indicating notch 24 also extends from the bottom edge 46 of the vane 22 partially toward the leading edge 40 of the vane 22.

The wear-indicating notch 24 includes a leading edge 50 and a trailing edge 52. In some implementations, the leading edge 50 of the notch 24 may be spaced a distance from an end of the leading edge 30, 40 of the vane 20, 22 that is less than fifty percent of a length of the at least one vane 20, 22 in a circumferential direction. Additionally or alternatively, in some implementations, the length of the notch 24 in the circumferential direction may be less than fifty percent of the length of the vane 20, 22 in the circumferential direction.

Following use of the high speed dispersion blade 10 to mix a viscous liquid and/or disperse material, a user may visually inspect the high speed dispersion blade while it remains in the tank to assess a level of wear of the high speed dispersion blade 10. During inspection, the user visually inspects the vanes 20 and 22 to evaluate whether the wear-indicating notch 24 on the vane 20, 22 is visible. If the wear-indicating notch 24 is not visible, then the vanes 20 and 22 of the high speed dispersion blade 10 have not worn down below a predetermined height and the blade 10 is still within its useful life. If the wear-indicating notch 24 is visible, then the vanes 20 and 22 of the blade 10 have worn down below their predetermined acceptable height and the high speed dispersion blade 10 should be replaced.

Because the wear rate of blades varies, for example based on a viscosity of the grind, hardness of the pigments or extenders, paint formulation, orders of addition, revolutions per minute, blade type, and total blade operating time, the method of assessing the high speed dispersion blade of the subject application prevents or reduces time and energy loss. Moreover, inspection of the wear-indicating notch requires at most a simple washing of the blade after completion of a manufacturing batch to remove any particles or mixing fluid present on the blade surface.

Surprisingly, blades with wear-indicating notches of the present disclosure are able to effectively and efficiently disperse pigments and extenders in high speed dispersion even though the notch itself reduces the lateral force applied to the pigment mixture. Introducing a notch in one or more vanes of a high speed dispersion blade would be expected to result in reduced mixing efficiency, or, if the notch is present only on some but not all vanes, that mixing would be uneven in the tank. It has surprisingly been discovered, however, that when pigments, extenders and other particles are mixed in a viscous liquid like a pigment dispersion, colorant, paint, or coating composition, mixing blades of the present disclosure capably mix and disperse particles homogeneously.

Moreover, the wear pattern of the mixing blade when used for high speed dispersion of pigments, extenders, or paints, is unequal on all surfaces of the mixing blade. It has been discovered that wear from dispersed pigments or extenders occurs at the top edge of the vane so as to make placement of a wear indicating notch on the vane feasible. Thus, when used, the wear pattern of mixing blades of the present disclosure is such that the top edge 34 of the vane wears linearly about perpendicular to the top edge 34 such that the wear-indicating notch is exposed to indicate a need to replace the blade. Surprisingly, when blades of the present disclosure are used to mix pigments, extenders and other particles in pigment dispersions, colorants, paints, or coatings, the wear pattern of the vane is such that the top edge wears towards the wear indicating notch. However, the edges of the wear indicating notch do not wear to a degree sufficient to sever part of the vane from the disc, as would be expected if the wear pattern were equal on all surfaces. Without being bound by theory, it is believed that the particle size of the particles mixed and the viscosity of the fluid makes the wear pattern particularly beneficial for mixing and dispersing pigment dispersions, colorants, paints, and coating compositions.

Figure 6:
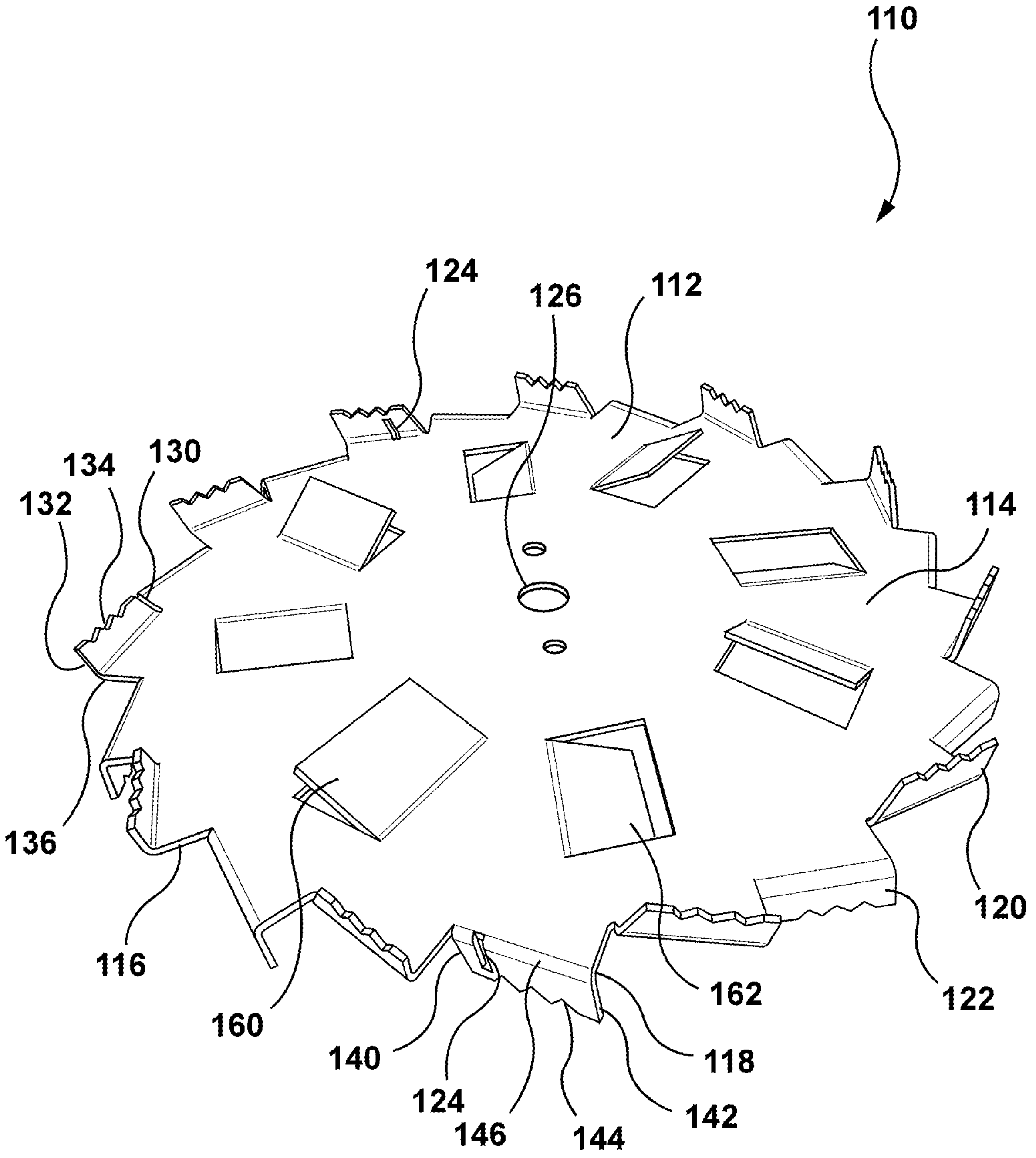
FIG. 6 is a perspective view of another exemplary mixing blade.

Turning now to FIG. 6, an exemplary embodiment of the high speed dispersion blade is shown at 110. The high speed dispersion blade 110 is substantially the same as the above-referenced high speed dispersion blade 10, and consequently the same reference numerals but indexed by 100 are used to denote structures corresponding to similar structures in the high speed dispersion blades. In addition, the foregoing description of the high speed dispersion blade 10 is equally applicable to the high speed dispersion blade 110 except as noted below.

The high speed dispersion blade 110 includes a disc 112 having a top surface 114, a bottom surface 116, an outboard edge 118, and a central opening 126, vanes 120, 122 circumferentially spaced around and extending from the outboard edge 118 of the disc 112, and a wear-indicating notch 124 in at least one of the vanes 120, 122. Each vane 120, 122 may be oriented non-horizontal to the top surface 114 of the disc 112. The vanes 120 may be oriented upward away from the top surface 114 of the disc 112 and the vanes 122 may be oriented downward away from the bottom surface 116 of the disc 112.

The wear-indicating notch 124 may be provided in one or more of the vanes 120 oriented upward and extending partially toward the top edge of the vane 120 from the bottom edge of the vane 120 and/or in one of the vanes 122 oriented downward and extending partially toward the top edge of the vane 122 from the bottom edge of the vane 122.

The vanes 120 each include a leading edge 130, a trailing edge 132, a top edge 134, and a bottom edge 136, and the vanes 122 each include a leading edge 140, a trailing edge 142, a top edge 144, and a bottom edge 146. The top edges 134 and 144 of at least one of the vanes 120 and 122, and as shown all the vanes 120 and 122, may be serrated to provide for additional grinding by providing additional cutting surfaces on the vanes 120 and 122.

The disc 112 may include one or more baffles 160, 162 circumferentially spaced around the disc 112 radially inwardly spaced from the vanes 120 and 122 and radially outwardly spaced from the central opening 126 configured to assist with pumping material through the blade 10. The baffles 160 and 162 may be oriented non-horizontal to the top surface 14 of the disc 112. The baffles 160 may be oriented upward away from the top surface 114 of the disc 112 and the baffles 162 may be oriented downward away from the bottom surface 116 of the disc 112. In an implementation, each baffle 160, 162 is oriented upward/downward opposite an adjacent baffle 160, 162 such that the baffles 160 and 162 alternate around the outboard edge 118 of the disc 112.

Figure 7:
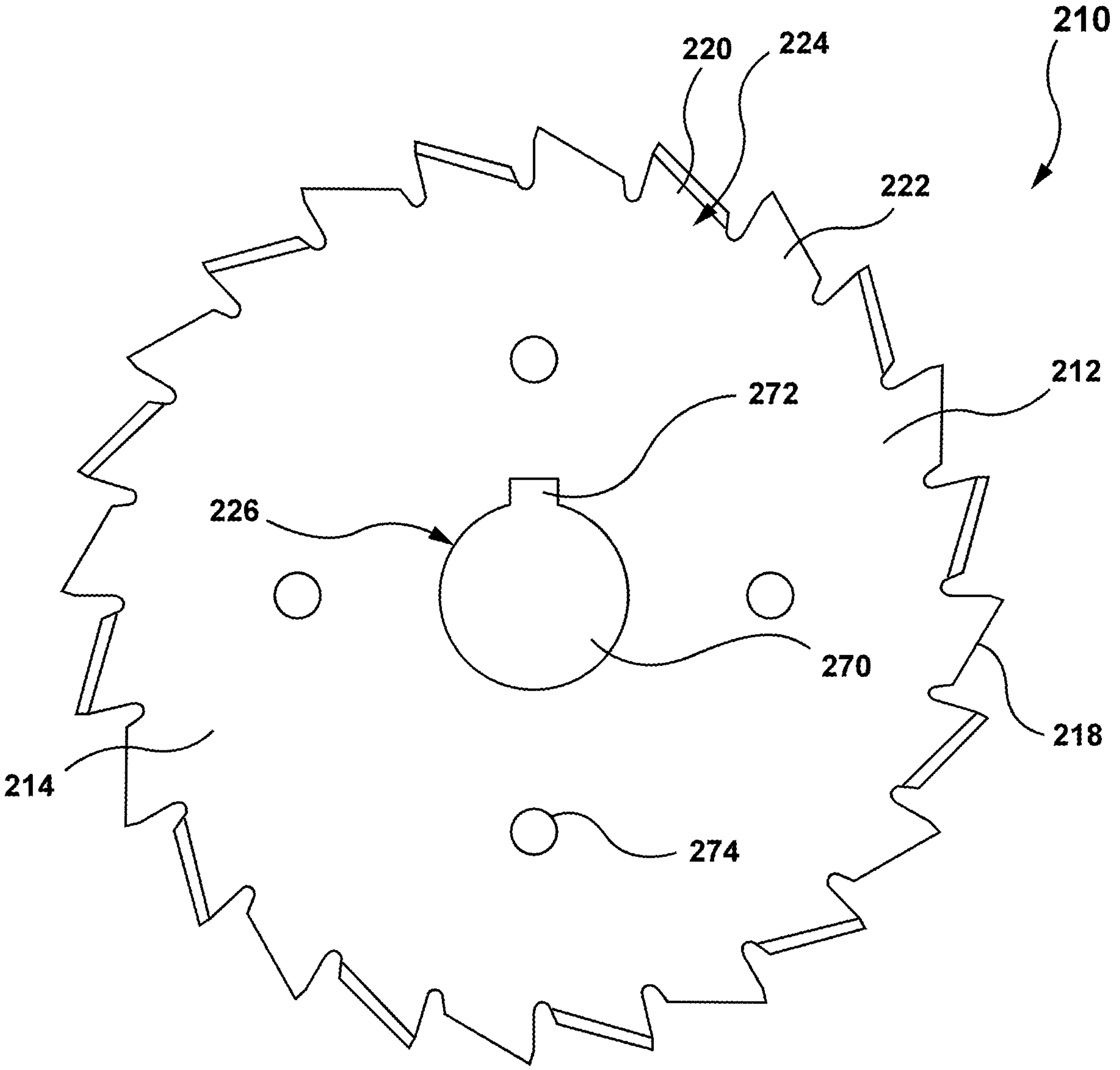
FIG. 7 is a top view of still another exemplary mixing blade.
Figure 8:
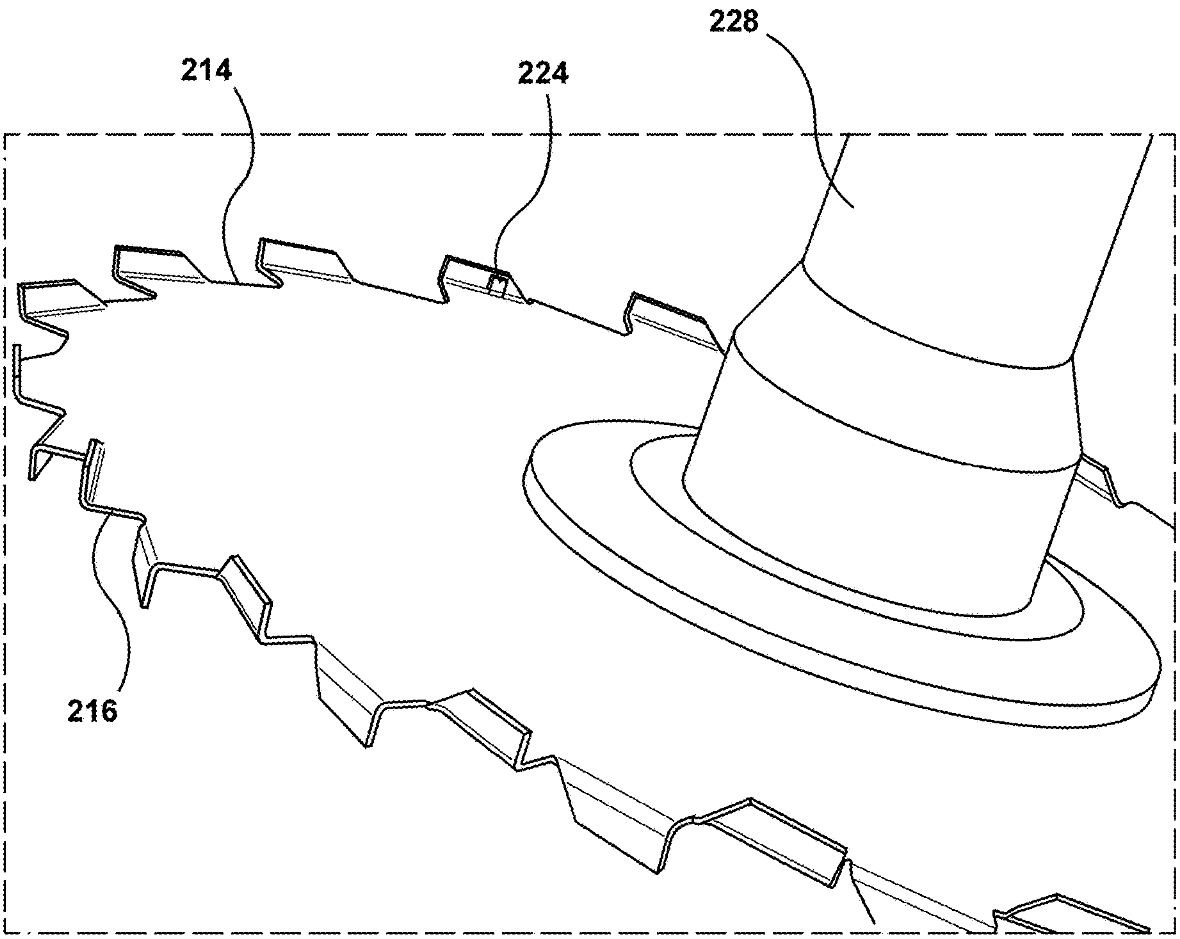
FIG. 8 is perspective view of another mixing blade assembly.

Turning now to FIGS. 7 and 8, an exemplary embodiment of the high speed dispersion blade is shown at 210. The high speed dispersion blade 210 is substantially the same as the above-referenced high speed dispersion blade 10, and consequently the same reference numerals but indexed by 200 are used to denote structures corresponding to similar structures in the high speed dispersion blades. In addition, the foregoing description of the high speed dispersion blade 10 is equally applicable to the high speed dispersion blade 210 except as noted below.

The high speed dispersion blade 210 includes a disc 212 having a top surface 214, a bottom surface 216, and an outboard edge 218, vanes 220, 222 circumferentially spaced around and extending from the outboard edge 218 of the disc 212, and a wear-indicating notch 224 in at least one of the vanes 220, 222. Each vane 220, 222 may be oriented non-horizontal to the top surface 214 of the disc 212. The vanes 220 may be oriented upward away from the top surface 214 of the disc 212 and the vanes 222 may be oriented downward away from the bottom surface 216 of the disc 212.

The wear-indicating notch 224 may be provided in one or more of the vanes 220 oriented upward and extending partially toward the top edge of the vane 220 from the bottom edge of the vane 220 and/or in one of the vanes 222 oriented downward and extending partially toward the top edge of the vane 222 from the bottom edge 246 of the vane 222.

The 212 disc may also include a central opening 226 for receiving a shaft 228 to effect rotation of the high speed dispersion blade 210. The central opening 226 may have a suitable size and shape for receiving the shaft 228, such as a keyhole having a center hole 270 and a keyway 272 to receive the correspondingly sized end of the shaft 228. Surrounding the central opening 226 may be one or more pin holes 274, such as four circumferentially spaced pin holes 274 for receiving correspond pins of the shaft 228.

Figure 9:
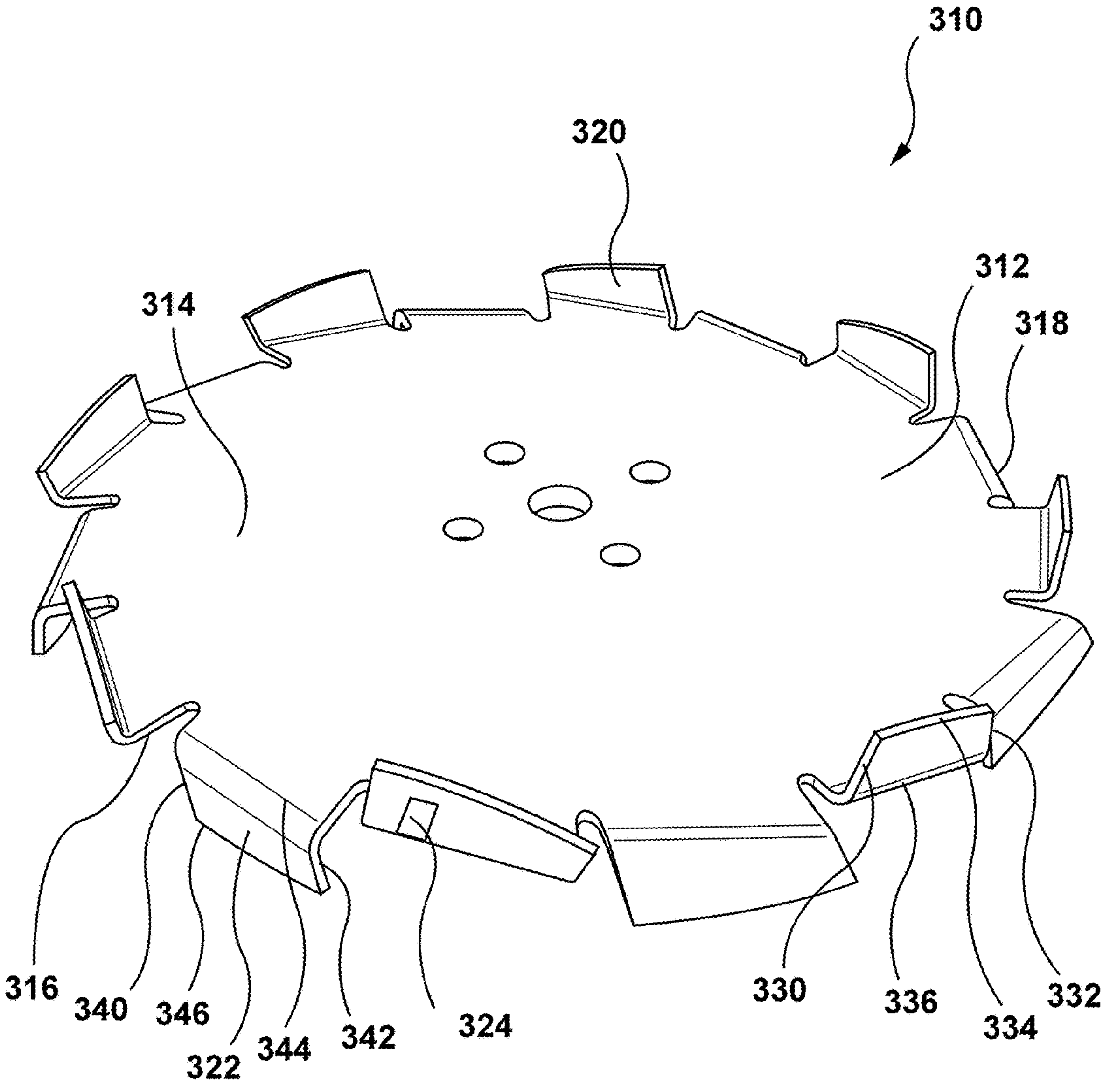
FIG. 9 is a perspective view of yet another exemplary mixing blade.

Turning now to FIG. 9, an exemplary embodiment of the high speed dispersion blade is shown at 310. The high speed dispersion blade 310 is substantially the same as the above-referenced high speed dispersion blade 10, and consequently the same reference numerals but indexed by 300 are used to denote structures corresponding to similar structures in the high speed dispersion blades. In addition, the foregoing description of the high speed dispersion blade 10 is equally applicable to the high speed dispersion blade 310 except as noted below.

The high speed dispersion blade 310 includes a disc 312 having a top surface 314, a bottom surface 316, and an outboard edge 318, vanes 320, 322 circumferentially spaced around and extending from the outboard edge 318 of the disc 312, and a wear-indicating notch 324 in at least one of the vanes 320, 322. Each vane 320, 322 may be oriented non-horizontal to the top surface 314 of the disc 312. The vanes 320 may be oriented upward away from the top surface 314 of the disc 312 and the vanes 322 may be oriented downward away from the bottom surface 316 of the disc 312. The vanes 320 each include a leading edge 330, a trailing edge 332, a top edge 334, and a bottom edge 336, and the vanes 322 each include a leading edge 340, a trailing edge 342, a top edge 344, and a bottom edge 346.

At least the vane 320, 322 with the wear-indicating notch 324, and as shown all of the vanes 320 and 322 have a trailing edge that is non-vertical. In an implementation, the vanes 320 and 322 have a trailing edge that is less than sixty percent of vertical compared to the top surface and bottom surface of the disc respectively. In an implementation, the vanes 320 and 322 have a trailing edge that is less than forty-five percent of vertical compared to the top surface and bottom surface of the disc respectively. In an implementation, the vanes 320 and 322 have a trailing edge that is less than thirty percent of vertical compared to the top surface and bottom surface of the disc respectively. In an implementation, the vanes 320 and 322 have a trailing edge that is less than ten percent of vertical compared to the top surface and bottom surface of the disc respectively.

The wear-indicating notch 324 may be provided in one or more of the vanes 320 oriented upward and extending partially toward the top edge of the vane 320 from the bottom edge of the vane 320 and/or in one of the vanes 322 oriented downward and extending partially toward the top edge of the vane 322 from the bottom edge 346 of the vane 322.

Figure 10:
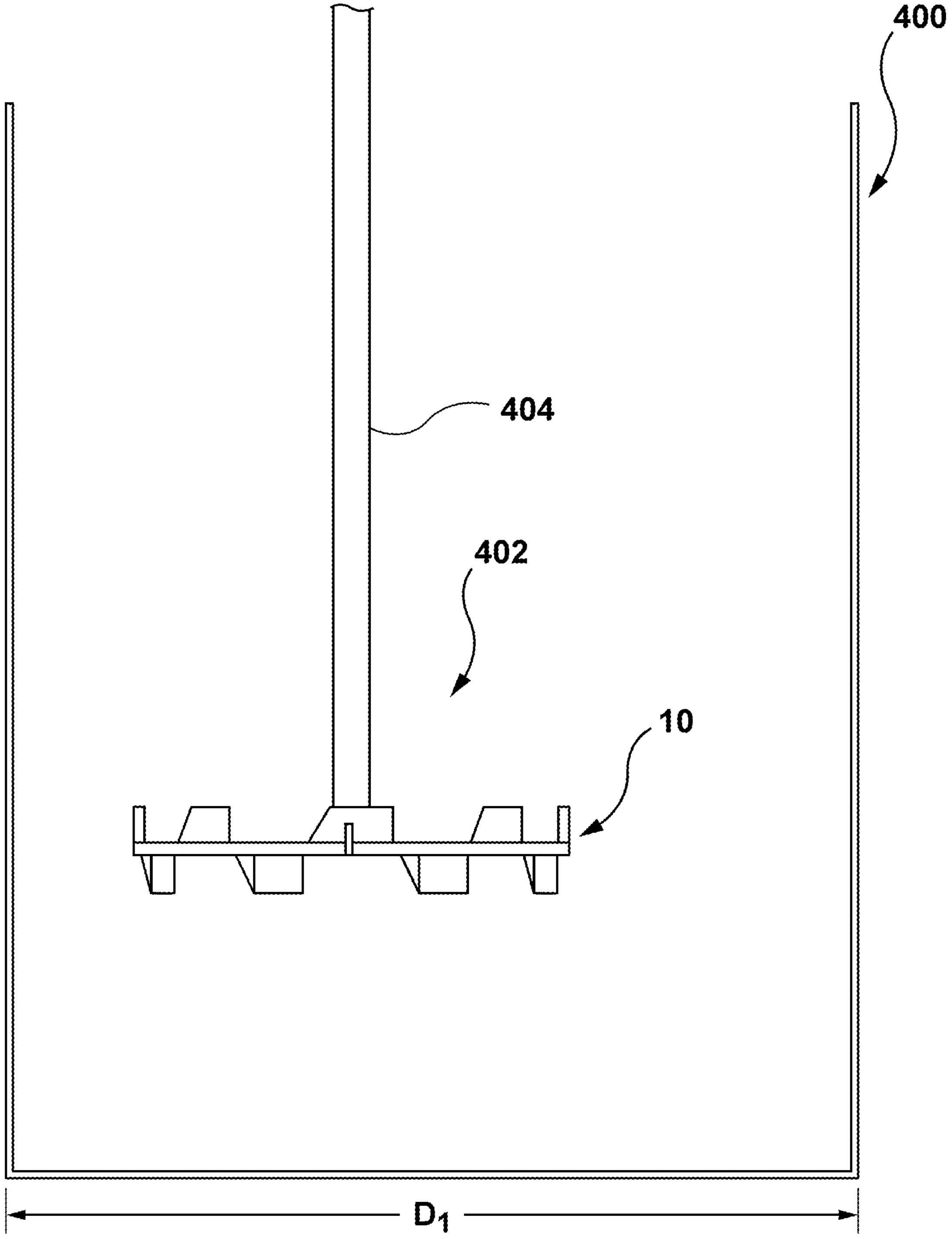
FIG. 10 is a side view of an exemplary mixing system.

Turning now to FIG. 10, an exemplary mixing system is illustrated. The mixing system may include a tank 400 for holding material and a mixing blade assembly 402. The mixing blade assembly 402 includes a shaft 404 coupled to the mixing blade 10, although it should be appreciated that any of the above described mixing blades 110, 210, or 310 may be used. In an implementation, the tank has a diameter D1 that is no less than two times a diameter of the mixing blade. In an implementation, the diameter D1 is no less than two and a half times the diameter of the mixing blade. In an implementation, the diameter D1 is no less than two and seven tenths times the diameter of the mixing blade. In an implementation, the diameter D1 is no less than two and nine tenths times the diameter of the mixing blade.

In an implementation, the diameter D1 is no more than four times the diameter of the mixing blade. In an implementation, the diameter D1 is no more than three and a half times the diameter of the mixing blade. In an implementation, the diameter D1 is no more than three and three tenth times the diameter of the mixing blade. In an implementation, the diameter D1 is no more than three and one tenth times the diameter of the mixing blade.

The aforementioned systems, components, (e.g., blades, discs, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present application, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component that performs the specified function of the described component (e.g., that is functionally equivalent), even though not structurally equivalent to the disclosed structure which performs the function in the illustrated implementations of the invention. In addition although a particular feature of the application may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the application, including the best mode, and also to enable one of ordinary skill in the art to practice the application, including making and using any devices or systems and performing any incorporated methods. The protectable scope of the application is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified and means an amount of a measurement accounting for error associated with the measurement technique and manufacturing variability. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the application has been described for purposes of illustrating the best mode known to the applicant at the time and enable one of ordinary skill in the art to practice the application, including making and using devices or systems and performing incorporated methods. The examples are illustrative only and not meant to limit the application, as measured by the scope and merit of the claims. The application has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the application is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

List of Exemplary Embodiments

The following are exemplary embodiments of the present disclosure, and are not intended to limit the scope of the disclosure.

Embodiment 1: A mixing blade comprising: a disc having top and bottom surfaces and an outboard edge; vanes circumferentially spaced around and extending from the outboard edge of the disc, each vane oriented non-horizontal to the top surface of the disc; and a wear-indicating notch in at least one of the vanes, wherein the mixing blade is suitable for mixing or dispersing pigments or mineral extenders for a paint, pigment dispersion, colorant, or coating.

Embodiment 2: The mixing blade according to Embodiment 1, wherein the wear-indicating notch extends partially toward a top edge of the vane from a bottom edge of the vane.

Embodiment 3: The mixing blade according to any one of Embodiments 1 or 2, wherein the bottom edge of the vane with the wear-indicating notch is coplanar with the top or bottom surface.

Embodiment 4: The mixing blade according to any one of Embodiments 2 or 3, wherein a first plurality of the vanes are oriented upward away from the top surface and a second plurality of the vanes are oriented downward away from the bottom surface, wherein the wear-indicating notch is on at least one of the vanes oriented upward and extends partially toward the top edge of the vane from the bottom edge of the vane coplanar with the bottom surface.

Embodiment 5: The mixing blade according to any one of Embodiments 2 to 4, wherein the wear-indicating notch extends about ten percent to about seventy-five percent of a height of the vane from the bottom edge to the top edge, optionally about sixty-percent, optionally about fifty percent.

Embodiment 6: The mixing blade according to any preceding Embodiments, wherein the at least one vane with the wear-indicating notch has a non-vertical leading edge.

Embodiment 7: The mixing blade according to any one of the preceding Embodiments, wherein the vanes have a non-vertical leading edge.

Embodiment 8: The mixing blade according to any one of Embodiments 6 or 7, wherein the wear-indicating notch extends from a bottom edge of the vane partially toward the leading edge of the vane.

Embodiment 9: The mixing blade according to any one of the preceding Embodiments, wherein the at least one vane with the wear-indicating notch has a trailing edge less than 60° of vertical compared to the top surface or bottom surface of the disc, preferably less than 45°, preferably less than 30°, preferably less than 10°.

Embodiment 10: The mixing blade according to any one of the preceding Embodiments, wherein a plurality of vanes have a trailing edge vertical to the top surface or bottom surface of the disc.

Embodiment 11: The mixing blade according to any one of Embodiments 1 to 8, wherein the at least one vane with the wear-indicating notch has a non-vertical trailing edge.

Embodiment 12: The mixing blade according to any one of Embodiments 1 to 8, wherein at least a portion of the vanes have a non-vertical trailing edge.

Embodiment 13: The mixing blade according to any one of the preceding Embodiments, wherein the at least one vane having a wear-indicating notch includes a leading edge and a trailing edge, and wherein a leading edge of the wear-indicating notch is spaced a distance from an end of the leading edge of the vane that is less than fifty percent of a length of the at least one vane in a circumferential direction.

Embodiment 14: The mixing blade according to any one of the preceding Embodiments, wherein the notch has a leading edge and a trailing edge, and wherein a length of the notch in a circumferential direction is less than fifty percent of a length of the vane in the circumferential direction.

Embodiments 15: The mixing blade according to any one of the preceding claims, wherein the disc has a diameter of at least about one inch, preferably at least about two inches, or at least about six inches, or at least about eighteen inches, or at least twenty-four inches.

Embodiment 16: The mixing blade according to any one of the preceding Embodiments, wherein the disc has a diameter of at most about forty inches, preferably at most about thirty inches, preferably at most about twenty-four inches, preferably at most about twelve inches, preferably at most about six inches, preferably at most about three inches.

Embodiment 17: The mixing blade according to any one of the preceding claims, wherein a plurality of the vanes are oriented upward away from the top surface, and a plurality of the vanes are oriented downward away from the bottom surface.

Embodiment 18: The mixing blade according to Embodiment 17, wherein each vane is oriented upward or downward opposite an adjacent vane.

Embodiment 19: The mixing blade according to any one of the preceding Embodiment, wherein at least one vane is oriented at least thirty degrees from the top or bottom surface, optionally at least forty-five degrees, optionally at least seventy-five degrees.

Embodiment 20: The mixing blade according to any one of the preceding Embodiments, wherein each vane is oriented at least thirty degrees from the top or bottom surface, optionally at least forty-five degrees, optionally at least seventy-five degrees.

Embodiment 21: The mixing blade according to any one of the preceding Embodiments, wherein the mixing blade is formed of metal, optionally steel, stainless steel, aluminum, or an alloy thereof.

Embodiment 22: The mixing blade of any one of the preceding Embodiments, wherein the blade is coated, optionally with a carbide coating, optionally a tungsten carbide coating, optionally a polymeric coating, and/or optionally a polytetrafluoroethylene coating.

Embodiment 23: The mixing blade according to any one of Embodiments 1 to 20, wherein the mixing blade is formed of polymer, optionally nylon.

Embodiment 24: The mixing blade of any one of the preceding Embodiments, wherein the disc includes a central opening for receiving a shaft.

Embodiment 25: The mixing blade of any one of the preceding Embodiments, wherein the disc includes one or more baffles.

Embodiment 26: The mixing blade of any one of the preceding Embodiments, wherein the top edge of at least one of the vanes is serrated.

Embodiment 27: The mixing blade of any one of the preceding Embodiments, wherein the mixing blade is a high speed dispersion blade.

Embodiment 28: A mixing blade assembly including the mixing blade according to claim 24 and a shaft configured to attach to the central opening of the disc.

Embodiment 29: The mixing blade assembly of Embodiment 28, wherein the mixing blade includes a reverse thread and the shaft includes a reverse thread for receiving the mixing blade.

Embodiment 30: The mixing blade assembly of any one of Embodiments 28 or 29, where in the disc includes a keyhole for receiving the shaft.

Embodiment 31: The mixing blade assembly of any one of the preceding Embodiments, wherein the paint or coating further includes a polymeric binder.

Embodiment 32: A mixing system comprising: the mixing blade assembly of any preceding claim; and a tank having a tank diameter.

Embodiment 33: The mixing system of Embodiment 32, wherein the tank diameter is no less than two times a diameter of the mixing blade, optionally no less than two and a half times, optionally no less than two and seven tenths times, optionally no less than two and nine tenths times.

Embodiment 34: The mixing system of any one of Embodiments 32 or 33, wherein the tank diameter is no more than four times the mixing blade diameter, no more than three and a half times, no more than three and three tenths times, and/or no more than three and one tenth times.

Embodiment 35: The mixing system of any one of claims 32 to 34, wherein the tank includes a paint, colorant, coating, or pigment dispersion.

Embodiment 36: A mixing blade comprising: a disc having a top surface and a bottom surface and an outboard edge; a first plurality of vanes circumferentially spaced around and extending from the outboard edge of the disc, each vane oriented upward away from the top surface of the vane and having a bottom edge coplanar with the bottom surface, and a top edge; a second plurality of vanes circumferentially spaced around and extending from the outboard edge of the disc, each vane oriented downward away from the bottom surface of the vane and having a bottom edge coplanar with the top surface, and a top edge; and a wear-indicating notch in at least one of the first or second plurality of vanes, the wear-indicating notch extending partially toward the top edge of the vane from the bottom edge of the vane; wherein the wear-indicating notch informs whether the blade has been worn by a pigment or extender.

Embodiment 37: The mixing blade according to Embodiment 36, wherein the wear-indicating notch extends about ten percent to about seventy-five percent of a height of the vane from the bottom edge to the top edge, optionally about sixty-percent, optionally about fifty percent.

Embodiment 38: The mixing blade, mixing blade assembly, or mixing system of any one of the preceding Embodiment, wherein the pigment is titanium dioxide.

Embodiment 39: A method of assessing a mixing blade for wear using the mixing blade of any preceding Embodiment, the method comprising: visually inspecting at least one vane of a mixing blade to evaluate whether a wear-indicating notch on the vane is visible following mixing a viscous liquid or dispersion using the blade.

Embodiment 40: The method of Embodiment 39, wherein the mixing is high speed dispersion.

What is claimed is:

1. A mixing system comprising:

a mixing blade having a disc having top and bottom surfaces and an outboard edge; vanes circumferentially spaced around and extending from the outboard edge of the disc, each vane oriented non-horizontal to the top surface of the disc; and a wear-indicating notch in at least one of the vanes extending through the at least one vane from an inner surface to an outer surface, wherein the mixing blade is a pigment or mineral extender mixing or dispersion blade for a paint, pigment dispersion, colorant, or coating; and a tank including a paint, pigment dispersion, colorant or coating.

2. The mixing system according to claim 1, wherein the wear-indicating notch extends partially toward a top edge of the vane from a bottom edge of the vane.

3. The mixing system according to claim 2, wherein the wear-indicating notch extends about ten percent to about seventy-five percent of a height of the vane from the bottom edge to the top edge.

4. The mixing system according to any one of claim 1, wherein the bottom edge of the vane with the wear-indicating notch is coplanar with the top or bottom surface.

5. The mixing system according to any claim 1, wherein a first plurality of the vanes are oriented upward away from the top surface and a second plurality of the vanes are oriented downward away from the bottom surface, wherein the wear-indicating notch is on at least one of the vanes oriented upward and extends partially toward the top edge of the vane from the bottom edge of the vane coplanar with the bottom surface.

6. The mixing system according to claim 1, wherein the at least one vane with the wear-indicating notch has a non-vertical leading edge, or wherein the vanes have a non-vertical leading edge.

7. The mixing system according to claim 1, wherein the wear-indicating notch extends from a bottom edge of the vane partially toward the leading edge of the vane.

8. The mixing system according to claim 1, wherein the at least one vane with the wear-indicating notch has a trailing edge less than 60° of vertical compared to the top surface or bottom surface of the disc.

9. The mixing system according to claim 1, wherein at least a portion of the vanes have a non-vertical trailing edge.

10. The mixing system according to claim 1, wherein the at least one vane having a wear-indicating notch includes a leading edge and a trailing edge, and wherein a leading edge of the wear-indicating notch is spaced a distance from an end of the leading edge of the vane that is less than fifty percent of a length of the at least one vane in a circumferential direction.

11. The mixing system according to claim 1, wherein the notch has a leading edge and a trailing edge, and wherein a length of the notch in a circumferential direction is less than fifty percent of a length of the vane in the circumferential direction.

12. The mixing system according to claim 1, wherein the disc has a diameter of at least about one inch and at most about forty inches.

13. The mixing system according to claim 1, wherein a plurality of the vanes are oriented upward away from the top surface, and a plurality of the vanes are oriented downward away from the bottom surface.

14. The mixing system according to claim 1, wherein the mixing blade is formed of polymer, optionally nylon, or wherein the mixing blade is formed of metal, optionally steel, stainless steel, aluminum, or an alloy thereof, and wherein if metal, the blade is optionally coated with a carbide coating, a tungsten carbide coating, a polymeric coating, or a polytetraflouroethylene coating.

15. A mixing system comprising:

a mixing blade having a disc having top and bottom surfaces and an outboard edge; vanes circumferentially spaced around and extending from the outboard edge of the disc, each vane oriented non-horizontal to the top surface of the disc and being integrally formed with the disc; and a wear-indicating notch in at least one of the vanes, wherein the mixing blade is a pigment or mineral extender mixing or dispersion blade for a paint, pigment dispersion, colorant, or coating; and a tank including a paint, pigment dispersion, colorant or coating.

16. The mixing system according to claim 15, wherein the wear-indicating notch extends partially toward a top edge of the vane from a bottom edge of the vane.

17. The mixing system according to any one of claim 15, wherein the bottom edge of the vane with the wear-indicating notch is coplanar with the top or bottom surface.

18. The mixing system according to any claim 15, wherein a first plurality of the vanes are oriented upward away from the top surface and a second plurality of the vanes are oriented downward away from the bottom surface, wherein the wear-indicating notch is on at least one of the vanes oriented upward and extends partially toward the top edge of the vane from the bottom edge of the vane coplanar with the bottom surface.

19. The mixing system according to claim 16, wherein the wear-indicating notch extends about ten percent to about seventy-five percent of a height of the vane from the bottom edge to the top edge.

20. The mixing system according to claim 15, wherein the at least one vane with the wear-indicating notch has a non-vertical leading edge, or wherein the vanes have a non-vertical leading edge.

21. The mixing system according to claim 15, wherein the wear-indicating notch extends from a bottom edge of the vane partially toward the leading edge of the vane.

22. The mixing system according to claim 15, wherein the at least one vane with the wear-indicating notch has a trailing edge less than 60° of vertical compared to the top surface or bottom surface of the disc.

23. The mixing system according to claim 15, wherein at least a portion of the vanes have a non-vertical trailing edge.

24. The mixing system according to claim 15, wherein the at least one vane having a wear-indicating notch includes a leading edge and a trailing edge, and wherein a leading edge of the wear-indicating notch is spaced a distance from an end of the leading edge of the vane that is less than fifty percent of a length of the at least one vane in a circumferential direction.

25. The mixing system according to claim 15, wherein the notch has a leading edge and a trailing edge, and wherein a length of the notch in a circumferential direction is less than fifty percent of a length of the vane in the circumferential direction.

26. The mixing system according to claim 15, wherein the disc has a diameter of at least about one inch and at most about forty inches.

27. The mixing system according to claim 15, wherein a plurality of the vanes are oriented upward away from the top surface, and a plurality of the vanes are oriented downward away from the bottom surface.

28. The mixing system according to claim 15, wherein the mixing blade is formed of polymer, optionally nylon, or wherein the mixing blade is formed of metal, optionally steel, stainless steel, aluminum, or an alloy thereof, and wherein if metal, the blade is optionally coated with a carbide coating a tungsten carbide coating a polymeric coating or a polytetraflouroethylene coating.

* * * * *